(12) United States Patent
Eva (10) Patent No.: US 11,987,521 B2
(45) Date of Patent: May 21, 2024

(54) SUBSTRATE FOR A REFLECTIVE OPTICAL ELEMENT

(71) Applicant: Carl Zeiss SMT GmbH, Oberkochen (DE)

(72) Inventor: Eric Eva, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 727 days.

(21) Appl. No.: 17/136,642

(22) Filed: Dec. 29, 2020

(65) Prior Publication Data

US 2021/0116616 A1 Apr. 22, 2021

Related U.S. Application Data

(63) Continuation of application No. PCT/EP2019/068176, filed on Jul. 5, 2019.

(30) Foreign Application Priority Data

Jul. 6, 2018 (DE) .......................... 102018211234.7

(51) Int. Cl.
| | | |
|---|---|---|
| *C03C 3/06* | (2006.01) | |
| *G02B 5/08* | (2006.01) | |
| *G02B 7/18* | (2021.01) | |
| *C03C 17/40* | (2006.01) | |

(52) U.S. Cl.
CPC .............. *C03C 3/06* (2013.01); *G02B 5/0891* (2013.01); *G02B 7/181* (2013.01); *C03B 2201/42* (2013.01); *C03C 17/40* (2013.01); *C03C 2201/21* (2013.01); *C03C 2201/23* (2013.01); *C03C 2201/42* (2013.01)

(58) Field of Classification Search
CPC ............ C03B 2201/42; C03B 2201/21; C03B 2201/23; C03C 3/06; C03C 2201/21; C03C 2201/23; C03C 2201/42
See application file for complete search history.

(56) References Cited

U.S. PATENT DOCUMENTS

| | | |
|---|---|---|
| 7,515,245 B2 | 4/2009 | Moors et al. |
| 8,093,165 B2 | 1/2012 | Koike et al. |
| 8,377,612 B2 | 2/2013 | Maida et al. |
| 9,586,850 B2 | 3/2017 | Ochs et al. |
| 9,746,773 B2 | 8/2017 | Maida et al. |
| 2005/0176572 A1 | 8/2005 | Hosono et al. |
| 2008/0004169 A1 | 1/2008 | Ellison |
| 2012/0183719 A1 | 7/2012 | Kuehn |
| 2012/0200913 A1 | 8/2012 | Van Kampen et al. |
| 2012/0327384 A1 | 12/2012 | Clauss |

FOREIGN PATENT DOCUMENTS

| | | | |
|---|---|---|---|
| CN | 1598697 A | 3/2005 | |
| CN | 101959812 A | 1/2011 | |
| CN | 102180595 A | 9/2011 | |
| CN | 102849929 A | 1/2013 | |
| CN | 105431388 A | 3/2016 | |
| DE | 102009043824 A1 | 2/2011 | |
| DE | 102009055119 A1 | 8/2011 | |
| DE | 102010009589 A1 | 9/2011 | |
| DE | 102011084117 A1 | 4/2013 | |
| DE | 102014225197 A1 | 11/2015 | |
| EP | 1795506 A1 | 6/2007 | |
| JP | H09235134 A | 9/1997 | |
| JP | 2001048571 A | 2/2001 | |
| JP | 2003286040 A | 10/2003 | |
| JP | 2005001930 A | 1/2005 | |
| JP | 2005067913 A | 3/2005 | |
| JP | 2011162359 A | 8/2011 | |
| JP | 2014199435 A | 10/2014 | |
| WO | 2005059972 A2 | 6/2005 | |
| WO | 2006004169 A1 | 1/2006 | |
| WO | 2009145288 A1 | 12/2009 | |
| WO | WO-2009145288 A1 * | 12/2009 | ............. B82Y 10/00 |
| WO | 2011104257 A1 | 9/2011 | |
| WO | 2013050199 A1 | 4/2013 | |

OTHER PUBLICATIONS

PCT International Preliminary Report on Patentability and Written Opinion, PCT/EP2019/068176, Jan. 12, 2021, 8 pages.
Chinese Office Action with English translation, Application No. 201980045269.2, Jun. 29, 2022, 20 pages.
Chinese Second Office Action with English translation, Application No. 201980045269.2, Jun. 30, 2023, 15 pages.
International Search Report, PCT/EP2019/068176, Oct. 18, 2019, 5 pages.
German Office Action with English translation, Application 102018211234.7, Jan. 23, 2019, 14 pages.
Japanese Office Action with English translation, Application No. 2021-500216, Aug. 1, 2023, 7 pages.

* cited by examiner

*Primary Examiner* — Elizabeth A. Bolden
(74) *Attorney, Agent, or Firm* — Edell, Shapiro & Finnan, LLC

(57) ABSTRACT

In order to reduce the degree of relaxation after an optical substrate has been compacted, in particular after a longer period, substrates (51) or reflective optical elements (50), in particular for EUV lithography, with substrates (51) of this type, are proposed. These substrates (51), which have a surface region (511) with a reflective coating (54), are characterised in that, at least near to the surface region (511), the titanium-doped quartz glass has a proportion of Si—O—Si bonds of at least $1*10^{16}/cm^3$ and/or a proportion of Si—Si bonds of at least $1*10^{16}/cm^3$ or, along a notional line (513) perpendicular to the surface region (511), over a length (517) of 500 nm or more, a hydrogen content of more than $5\times10^{18}$ molecules/$cm^3$.

19 Claims, 5 Drawing Sheets

SUBSTRATE FOR A REFLECTIVE OPTICAL ELEMENT

CROSS REFERENCE TO RELATED APPLICATIONS

This is a Continuation of International Application PCT/EP2019/068176, which has an international filing date of Jul. 5, 2019, and which claims the priority of German Patent Application 10 2018 211 234.7, filed Jul. 6, 2018. The disclosures of both applications are incorporated in their respective entireties into the present Continuation by reference.

FIELD OF THE INVENTION

The present invention relates to substrates for a reflective optical element for the extreme ultraviolet wavelength range made of titanium-doped quartz glass that have a surface region that is to be coated. It additionally relates to reflective optical elements for the extreme ultraviolet wavelength range having such a substrate that has a surface region having a reflective coating. The invention furthermore relates to an optical system with such reflective optical elements and to an EUV lithography apparatus with such an optical system or such a reflective optical element.

BACKGROUND

In order to be able to produce ever finer structures during the production of, for example, semiconductor components with lithographic methods, light of ever shorter wavelengths is employed. If the operating wavelength range employed is in the extreme ultraviolet (EUV), for instance at wavelengths of between approximately 5 nm and 20 nm, it is no longer possible to employ lens-like elements that operate in transmission; rather, illumination and projection lenses are constructed from mirror elements having reflective coatings adapted to the respective working wavelength.

So-called zero expansion materials, the coefficient of thermal expansion of which approaches zero in the range of the temperatures prevailing during lithography operation, which are slightly above room temperature, are used as substrate material in particular for reflective optical elements for EUV lithography. Particularly important here are glass ceramics and titanium-doped quartz glass. These materials can be produced such that at a temperature that depends on the specific material, the coefficient of thermal expansion—which is defined here as the differential according to the temperature of the relative linear expansion as a function of the temperature—becomes zero. In the case of titanium-doped quartz glass, this effect can be influenced by the content of additives, in the case of glass ceramics by recrystallization processes under strictly controlled reheating cycles.

EUV lithography apparatuses rely on the fact that the reflective optical elements used for imaging a mask into an image plane have a high accuracy in relation to their surface shape. Likewise, masks, as reflective optical elements for the EUV wavelength range, should have a high accuracy in relation to their surface shape since the replacement thereof is reflected not insignificantly in the operating costs of an EUV lithography apparatus.

Conventional methods of correcting surfaces are typically based on removing the substrate material from optical elements mechanically or by irradiating with ions. A further approach to correcting the surfaces is to locally compact the substrate material of optical elements by irradiating it with electromagnetic radiation or preferably with electrons. This procedure is described, for example, in WO 2013/050199 A1 and has the advantage that it can also be used for substrates that have already been coated, in particular reflective optical elements.

However, it has been found that the corrections to the surface shape carried out by compaction through irradiation show relaxation effects, in particular during storage and operation of the reflective optical elements, which can have a negative effect on the imaging properties. In particular, it cannot be ruled out that the corrections will regress completely after a few years.

SUMMARY

It is an object of the present invention to provide an option for improving the long-term stability of the surface shape of a reflective optical element.

This object is achieved in a first aspect by a substrate for a reflective optical element for the extreme ultraviolet wavelength range that is made of titanium-doped quartz glass that has a surface region that is to be coated, wherein the titanium-doped quartz glass has at least in the vicinity of the surface region a proportion of Si—O—O—Si bonds of at least $1*10^{16}/cm^3$ and/or a proportion of Si—Si bonds of at least $1*10^{16}/cm^3$.

This and the following aspects seek to influence the relaxation after a compaction of the substrate material by changing the structure of the glass matrix in a targeted manner.

It is assumed that peroxy bonds in the glass matrix (Si—O—O—Si) or Si—Si bonds (also known as oxygen deficient centers) form quasi predetermined breaking points, which break up particularly easily under the influence of high-energy irradiation, in particular with electrons, as is used for compaction. These bonds, however, cannot recombine so easily, in contrast to normal matrix bonds. A substrate with such a non-stoichiometric matrix can be easily compacted. However, it relaxes less than a substrate with a stoichiometric matrix, in which, for example, narrower $SiO_2$ rings form or normal Si—O bonds within the tetrahedral basic structure of quartz glass break up. The surface shape of a substrate proposed here should therefore have a better long-term stability.

The titanium-doped quartz glass preferably has at least in the vicinity of the surface region a proportion of Si—O—O—Si bonds of at least $1*10^{17}/cm^3$ or even at least $5*10^{17}/cm^3$, preferably at least $1*10^{18}/cm^3$ or even at least $5*10^{18}/cm^3$, with particular preference at least $1*10^{19}/cm^3$ or even at least $5*10^{19}/cm^3$, with very particular preference at least $1*10^{20}/cm^3$, and/or a proportion of Si—Si bonds of at least $1*10^{17}/cm^3$ or even at least $5*10^{17}/cm^3$, preferably at least $1*10^{18}/cm^3$ or even at least $5*10^{18}/cm^3$, with particular preference at least $1*10^{19}/cm^3$ or even at least $5*10^{19}/cm^3$, with very particular preference at least $1*10^{20}/cm^3$. The greater the number of predetermined breaking points in the form of Si—O—O—Si bonds or Si—Si bonds that are present in the matrix, the easier it is to suppress long-term relaxation of surface corrections made by irradiation.

In a preferred embodiment, the titanium-doped quartz glass has an average hydroxyl content of at most 100 ppm by weight at least in the vicinity of the surface region. It has been found that a relaxation of compactions in the matrix of in particular titanium-doped quartz glass can take place structurally through displacements in the glass matrix or through recombination of broken bonds. The glass matrix is capable of displacements particularly if it is rich in matrix terminators. Matrix terminators should here be understood to mean defects that interrupt the strict tetrahedral structure of an ideal quartz glass matrix in which each silicon or titanium atom is coordinated four times by one oxygen atom in each case. Aside from hydroxyl, the matrix terminators include, for example, SiF, SiOH, SiH, TiF, TiOH, TiH, $TiO_3$ and $TiO_2$. The aim is to keep the number of hydroxyl groups as low as possible in parallel to the highest possible number of predetermined breaking points in order to further reduce the probability of relaxation after compaction over longer time periods.

In such embodiments, the titanium-doped quartz glass preferably has in the vicinity of the surface region a content of further matrix terminators aside from those with a hydroxyl group of maximally 20% of the hydroxyl content in order to be able to further intensify the effect of less relaxation after compaction.

The titanium-doped quartz glass advantageously has a hydrogen content of less than $1\times 10^{16}$ molecules/$cm^3$ at least in the vicinity of the surface region. This is because it has been shown that, particularly at higher temperatures, hydrogen can lead to the formation of SiH and SiOH on weakened bonds, which in turn can act as matrix terminators.

The titanium-doped quartz glass preferably has at least in the vicinity of the surface region silicon fluoride or silicon chloride.

In a second aspect, this object is achieved by a substrate for a reflective optical element for the extreme ultraviolet wavelength range made of titanium-doped quartz glass that has a surface region that is to be coated, wherein the titanium-doped quartz glass has a hydrogen content of more than $5\times 10^{18}$ molecules/$cm^3$ along an imaginary line perpendicular to the surface region over a length of 500 nm or more.

This approach is based on the assumption that titanium-doped quartz glass heavily loaded with hydrogen can exhibit greater material compaction when irradiated than titanium-doped quartz glass that is loaded less with hydrogen. It is assumed that broken matrix bonds of the form Si—O—Si→Si+Si—O react in the presence of an excess of hydrogen to form SiH and SiOH, while they recombine to some extent again in the case of a lack of hydrogen. It is assumed that, if a lot of hydrogen is added to a hydrogen-poor and at least locally compacted substrate, for example by introducing it into a hydrogen-containing atmosphere or by purging with hydrogen-containing gas, rearranged but energetically unfavorable bonds may thereby be attacked and saturated, which should suppress slow relaxation. If a lot of hydrogen is supplied to the substrate before compaction, compaction will presumably lead not so much to a rearrangement of the matrix but rather to permanently broken bonds. This should reduce the relaxation rate and thus allow a better long-term stability of the surface of the substrate to be achieved. The substrate preferably has in the vicinity of the surface region a region of a thickness of at least 500 nm with an increased hydrogen content before, during, and immediately after the compaction for correction purposes.

The titanium-doped quartz glass preferably has a hydrogen content of more than $1\times 10^{19}$ molecules/$cm^3$, with particular preference more than $1\times 10^{20}$ molecules/$cm^3$, along an imaginary line perpendicular to the surface region over a length of 500 nm or more in order to be able to lower the relaxation rate more strongly. The titanium-doped quartz glass of the substrate proposed here has, with particular preference, said high hydrogen content before, during, and/or immediately after the irradiation.

The titanium-doped quartz glass advantageously has at least in the vicinity of the surface region a proportion of Si—O—O—Si bonds of at least $1*10^{16}$/$cm^3$ and/or a proportion of Si—Si bonds of at least $1*10^{16}$/$cm^3$ in order to additionally reduce the relaxation process after a compaction by irradiation. It is particularly advantageous if the titanium-doped quartz glass has at least in the vicinity of the surface region a proportion of Si—O—O—Si bonds of at least $1*10^{17}$/$cm^3$ or even at least $5*10^{17}$/$cm^3$, preferably at least $1*10^{18}$/$cm^3$ or even at least $5*10^{18}$/$cm^3$, with particular preference at least $1*10^{19}$/$cm^3$ or even at least $5*10^{19}$/$cm^3$, with very particular preference at least $1*10^{20}$/$cm^3$, and/or a proportion of Si—Si bonds of at least $1*10^{17}$/$cm^3$ or even at least $5*10^{17}$/$cm^3$, preferably at least $1*10^{18}$/$cm^3$ or even at least $5*10^{18}$/$cm^3$, with particular preference at least $1*10^{19}$/$cm^3$ or even at least $5*10^{19}$/$cm^3$, with very particular preference at least $1*10^{20}$/$cm^3$. The more predetermined breaking points in the form of Si—O—O—Si bonds or Si—Si bonds are present in the matrix, the easier it is to suppress long-term relaxation of surface corrections made by irradiation.

In a third aspect, this object is achieved by a reflective optical element for the extreme ultraviolet wavelength range with a substrate as just described, which has a surface region with a reflective coating.

Because of the special substrate materials proposed here, said reflective optical elements are particularly well suited for being corrected in terms of their surface shape by irradiation and a corresponding compaction of the substrate material. This is because the relaxation of this compaction is less pronounced, especially over long time periods of months and years, than with substrates made of conventional titanium-doped quartz glasses. The surface profile of the substrate desired for the respective reflective optical element can essentially be shaped even before a reflective coating is applied, wherein irradiation that can lead to a compaction and thus to a change in the surface profile at least in the irradiated region can also be used for this purpose. After coating, the respective reflective optical element can be checked individually or in combination with further optical elements for example in terms of the desired function and then finely corrected accordingly.

In preferred embodiments, the substrate has a hydrogen content of more than $5\times 10^{18}$ molecules/$cm^3$, preferably more than $1\times 10^{19}$ molecules/$cm^3$, with particular preference more than $1\times 10^{20}$ molecules/$cm^3$, along an imaginary line perpendicular to the surface region with the reflective coating over a length of 500 nm or more in order to be able to lower the relaxation rate more strongly.

The length of 500 nm or more with particular preference has a distance from the reflective coating of no more than 1 mm, preferably no more than 100 µm, with particular preference no more than 20 µm, with very particular preference no more than 5 µm. This is because it has been found that it is sufficient if the desired high hydrogen content is formed in particular in the region immediately below the reflective coating, in which the corrections whose relaxation is intended to be minimized are also carried out.

The substrate with particular preference has a hydrogen content of less than $5\times 10^{17}$ molecules/$cm^3$, preferably less than $1\times 10^{17}$ molecules/$cm^3$, with particular preference less than $1\times 10^{16}$ molecules/$cm^3$, along the imaginary line perpendicular to the surface region with the reflective coating at a distance therefrom of at least 1 mm, preferably at least 1 cm. Since the substrate has in its interior, that is to say in particular aside from the region immediately below the reflective coating, a lower hydrogen content, it can be ensured that other material properties of the titanium-doped quartz glass are not negatively influenced by an excessively high hydrogen content.

The substrate advantageously has a hydrogen content of more than $5 \times 10^{18}$ molecules/cm$^3$ within a time period of up to one month after application of the reflective coating along an imaginary line perpendicular to the surface region with the reflective coating over a length of 500 nm or more and has a hydrogen content of more than $1 \times 10^{18}$ molecules/cm$^3$ within a time period from one month after application of the reflective coating up to seven years after application of the reflective coating. It is expected that this long-term behavior of the hydrogen content can lead to the lowest possible relaxation even over a time period of several years of corrections introduced into the reflective optical element.

In the case of a reflective optical element whose substrate has a further surface region, which is located on a side of the substrate facing away from the surface region with the reflective coating and has no reflective coating, the substrate preferably has along the imaginary line over a further length of 500 nm or more at a distance of no more than 2 mm from the surface of the further, uncoated surface region, a hydrogen content of no more than half and no less than one twentieth of the hydrogen content over the length at a distance of no more than 1 mm from the reflective coating.

Furthermore, the object is achieved by an optical system having a reflective optical element as described above and by an EUV lithography apparatus having such an optical system or having a reflective optical element as described above. In this way, optical systems or EUV lithography apparatuses that can have good optical properties with good long-term stability can be provided. Further preferred applications of the reflective optical elements based on the substrates proposed here include optical systems for inspection systems for example for wafers or masks or for spectroscopic applications, for example in astrophysics, in particular extraterrestrial physics.

BRIEF DESCRIPTION OF THE DRAWINGS

The present invention will be explained in greater detail with reference to preferred exemplary embodiments. In this respect.

DETAILED DESCRIPTION

Figure 1:
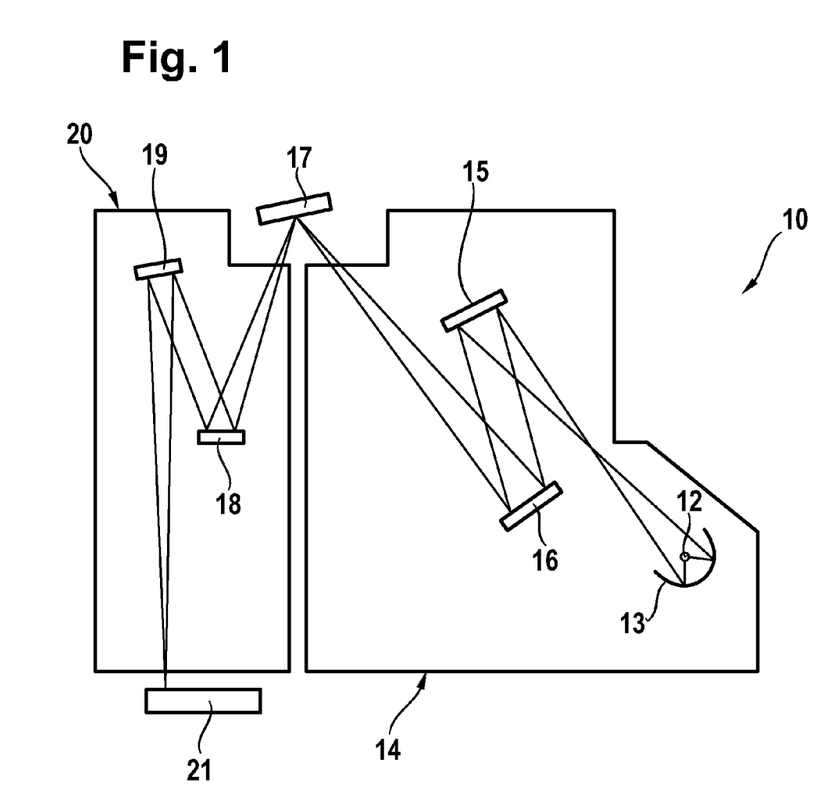
FIG. 1 schematically shows an embodiment of an EUV lithography apparatus.

FIG. 1 schematically shows an EUV lithography apparatus 10. Predominant components are the illumination system 14, the photomask 17, and the projection system 20. The EUV lithography apparatus 10 is operated under vacuum conditions so that the EUV radiation in the interior thereof is absorbed as little as possible.

A plasma source or a synchrotron can serve for example as the radiation source 12. In the example illustrated here, the radiation source is a plasma source. The emitted radiation in the wavelength range of approximately 5 nm to 20 nm is initially focused by the collector mirror 13. The operating beam is then introduced into the illumination system 14. In the example illustrated in FIG. 1, the illumination system 14 has two mirrors 15, 16. The mirrors 15, 16 guide the beam onto the photomask 17 having the structure that is intended to be imaged onto the wafer 21. The photomask 17 is likewise a reflective optical element for the EUV and soft X-ray wavelength ranges, which is interchanged depending on the production process. With the aid of the projection system 20, the beam reflected by the photomask 17 is projected onto the wafer 21, and the structure of the photomask is thereby imaged onto said wafer. In the example illustrated, the projection system 20 has two mirrors 18, 19. It should be pointed out that both the projection system 20 and the illumination system 14 can each have just one or else three, four, five or more mirrors.

In principle, all reflective optical elements 13, 15, 16, 17, 18, 19 of the EUV lithography apparatus 10 can have a substrate made of titanium-doped quartz glass that has a surface region that is to be coated, wherein the titanium-doped quartz glass has a proportion of Si—O—O—Si bonds of at least $1*10^{16}$/cm$^3$ and/or a proportion of Si—Si bonds of at least $1*10^{16}$/cm$^3$ at least in the vicinity of the surface region or a hydrogen content of more than $5\times10^{18}$ molecules/cm$^3$ along an imaginary line perpendicular to the surface region over a length of 500 nm or more. The possibility of being able to carry out a fine correction of the surface profile that is stable over the long term is important in particular in the case of mirrors of the projection system 20, since the projection system should ideally have the most exact imaging properties possible. Said reflective optical elements can have in their respective substrate a hydrogen content of more than $5\times10^{18}$ molecules/cm$^3$, preferably more than $1\times10^{19}$ molecules/cm$^3$, with particular preference more than $1\times10^{20}$ molecules/cm$^3$, at least along an imaginary line perpendicular to the surface region with the reflective coating over a length of 500 nm or more.

Figure 2:
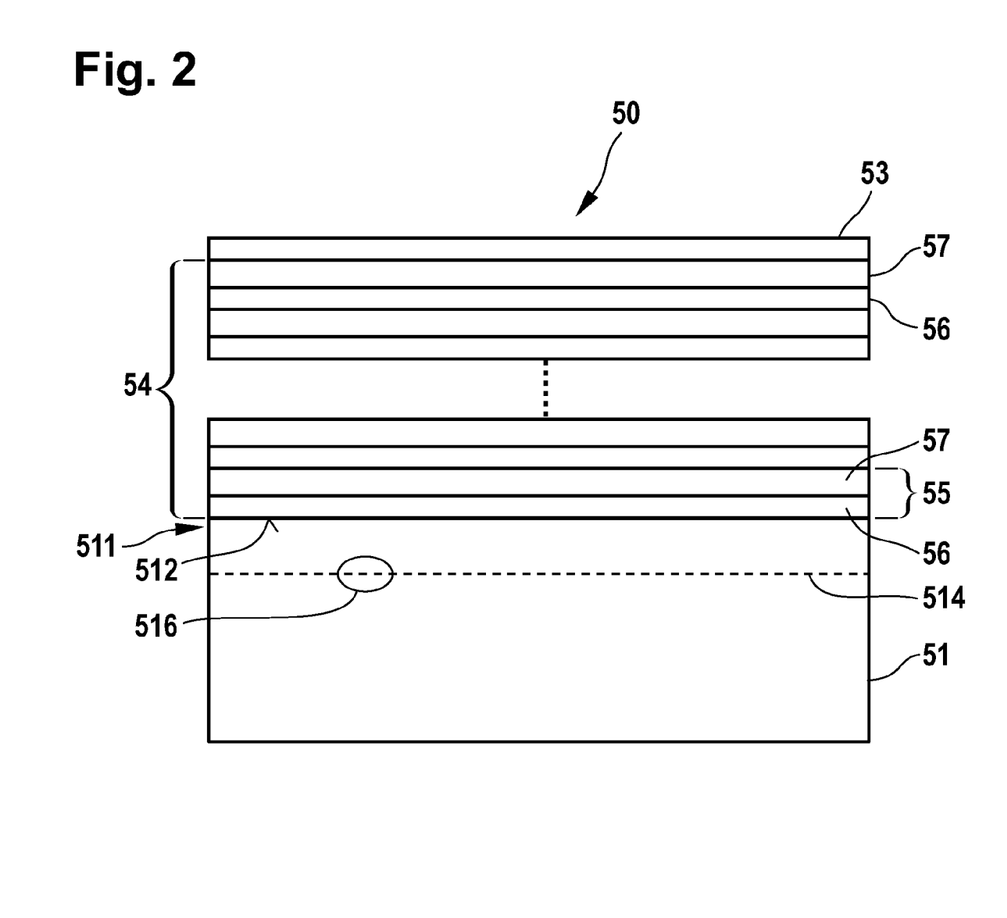
FIG. 2 shows a schematic diagram of a first embodiment of a proposed reflective optical element.
Figure 3:
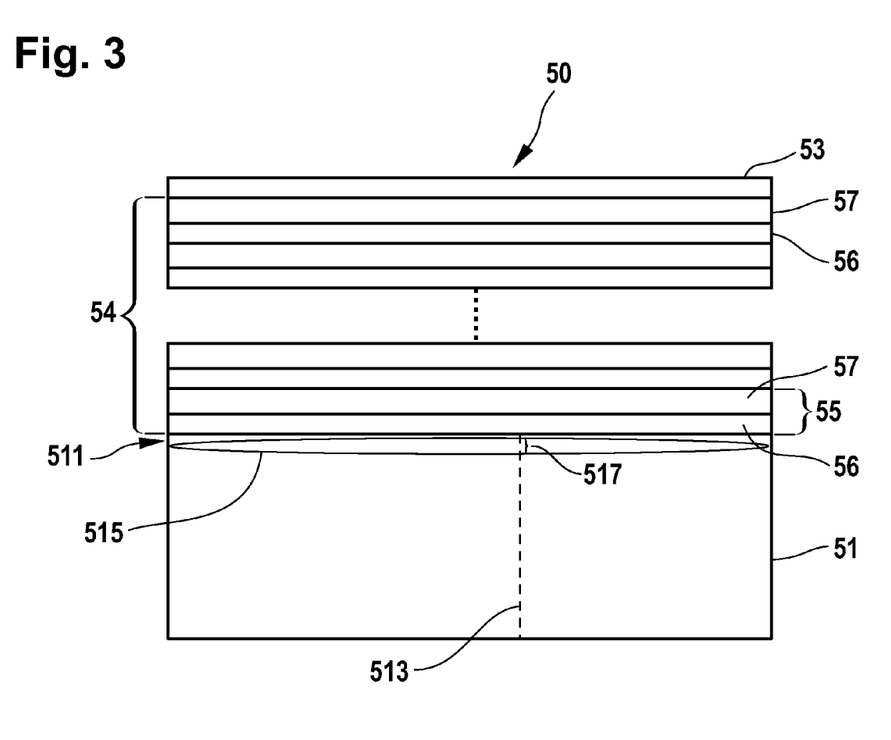
FIG. 3 shows a schematic diagram of a second embodiment of a proposed reflective optical element.

In the example shown here, the illumination system mirrors 15, 16, the photomask 17, and the projection system mirrors 18, 19 are mirrors 50 for quasi-normal incidence, the reflective coating of which is based on a multilayer system 54, as is shown schematically in FIGS. 2 and 3. This involves alternately applied layers of a material having a higher real part of the refractive index at the working wavelength at which for example the lithographic exposure is carried out (also called spacer 57) and of a material having a lower real part of the refractive index at the working wavelength (also called absorber 56), wherein an absorber-spacer pair forms a stack 55. In a sense, this simulates a crystal, the lattice planes of which correspond to the absorber layers at which Bragg reflection takes place. The thicknesses of the individual layers 56, 57 and also of the repeating stacks 55 can be constant over the entire multilayer system 54 or vary, depending on what spectral or angle-dependent reflection profile is intended to be achieved. The reflection profile can also be influenced in a targeted manner in that the basic structure composed of absorber 56 and spacer 57 is supplemented by further more and less absorbent materials in order to increase the possible maximum reflectivity at the respective working wavelength. To that end, in some stacks absorber and/or spacer materials can be mutually interchanged, or the stacks can be constructed from more than one absorber and/or spacer material. The absorber and spacer materials can have constant or varying thicknesses over all the stacks in order to optimize the reflectivity. Furthermore, it is also possible to provide additional layers as diffusion barriers between spacer and absorber layers 57, 56. A material combination that is customary for example for a working wavelength of 13.4 nm is molybdenum as absorber material and silicon as spacer material. In this case, a stack 55 usually has a thickness of just under 7 nm, wherein the spacer layer 57 is usually thicker than the absorber layer 56.

In the example illustrated here, the coating 52 additionally has an optional protective layer 53, which can also consist of more than one layer. In the case of a molybdenum-silicon multilayer system, for example, the protective layer 53 can be made up of, among other things, a layer of silicon nitride and a layer of ruthenium as a closing-off to the vacuum in order to be used at wavelengths of approximately 13.5 nm. Further suitable material combinations, also for other wavelengths in the EUV wavelength range, are known to a person skilled in the art.

In principle, the reflective optical elements proposed here can also be designed for grazing incidence. To this end, one or a few metallic layers that reflect the EUV radiation based on the phenomenon of total internal reflection can be provided on the substrate.

The coating 54 is arranged on a substrate 51 made of titanium-doped quartz glass. In a first variant, the substrate 51 of the reflective optical element for the extreme ultraviolet wavelength range, for example a mirror from the projection system of an EUV lithography apparatus, has a surface region 511 that is to be coated and has already been coated here as described. The substrate 51 has at least in the vicinity of the surface region 511 a proportion of Si—O—O—Si bonds of at least $1*10^{16}/cm^3$ and/or a proportion of Si—Si bonds of at least $1*10^{16}/cm^3$. It is particularly advantageous if the titanium-doped quartz glass has at least in the vicinity of the surface region 511 a proportion of Si—O—O—Si bonds of at least $1*10^{17}/cm^3$ or even at least $5*10^{17}/cm^3$, preferably at least $1*10^{18}/cm^3$ or even at least $5*10^{18}/cm^3$, with particular preference at least $1*10^{19}/cm^3$ or even at least $5*10^{19}/cm^3$, with very particular preference at least $1*10^{20}/cm^3$, and/or a proportion of Si—Si bonds of at least $1*10^{17}/cm^3$ or even at least $5*10^{17}/cm^3$, preferably at least $1*10^{18}/cm^3$ or even at least $5*10^{18}/cm^3$, with particular preference at least $1*10^{19}/cm^3$ or even at least $5*10^{19}/cm^3$, with very particular preference at least $1*10^{20}/cm^3$.

The higher the proportion of these bonds in the quartz glass matrix is, the more predetermined breaking points there are that break particularly easily under high-energy irradiation. As a result, the corresponding titanium-doped quartz glass can be compacted particularly well under high-energy irradiation. Since these bonds cannot be recombined as easily as normal matrix bonds, i.e. they do not return to their original state as easily after the radiation-induced combination, such substrates show less relaxation than conventional substrates based on titanium-doped quartz glass. Titanium-doped quartz glass with such a composition can be obtained in flame hydrolysis or via a soot process under oxidizing conditions for an increased proportion of Si—O—O—Si bonds or under reducing conditions for an increased proportion of Si—Si bonds. In the case of flame hydrolysis, the flame can be operated for example with an excess of oxygen (oxidizing conditions) or with an excess of hydrogen (reducing conditions). In the case of a soot process, the $SiO_2$ powder can for oxidizing conditions instead or additionally be treated in an oxygen, nitrous oxide, or water vapor atmosphere at elevated temperatures. In order to achieve reducing conditions, physical drying with elevated temperatures and/or application of a vacuum or chemical drying with the addition of halogens can take place, so that silicon chloride or silicon fluoride are formed, for example.

In variants, the substrate 51 additionally has at least in the vicinity of the surface region 511 an average hydroxyl content of at most 100 ppm by weight in order to thereby provide a reduced number of matrix terminators and to reduce the probability of relaxation after compaction. The substrate 51 with particular preference has at least in the vicinity of the surface region 514 a matrix terminator content of at most 20% of the hydroxyl content in order to further reduce the probability of relaxation. Further matrix terminators in addition to OH groups can be, for example, SiOH, SiF, SiH, TiOH, TiF, TiH, $TiO_2$, $TiO_3$. The blanks for such substrates are preferably produced using soot processes. The hydroxyl content can be reduced, in particular, by way of drying or, respectively, producing and storing it in a particularly dry atmosphere.

In this variant, the substrate advantageously has a hydrogen content of less than $1\times10^{16}$ molecules/cm$^3$ in the vicinity of the surface region 511 or further inside the substrate 51 in order not to run the risk of reducing the effect achieved by the high purity of the titanium-doped quartz glass again by a slight increase in hydrogen-related matrix terminators such as SiOH and SiH. The hydrogen content can be reduced, for example, by carrying out direct deposition of quartz glass in a low-hydrogen, reducing atmosphere in the case of flame hydrolysis, for example by using natural gas or methane instead of oxyhydrogen gas as fuel. Quartz glass deposited using a soot process does not include any hydrogen a priori unless it is specifically added.

In a second variant, which is shown schematically in FIG. 3, the substrate 51 has a hydrogen content of more than $5\times10^{18}$ molecules/cm$^3$, preferably more than $1\times10^{19}$ molecules/cm$^3$, with particular preference more than $1\times10^{20}$ molecules/cm$^3$, along an imaginary line 513 perpendicular to the surface region 511 over a length 517 of 500 nm or more. As a result, more and more permanently broken bonds that can reduce relaxation of the compaction can be generated during compaction by high-energy irradiation. In the example shown here, the region 515 with an increased hydrogen content is located in the surface region 511 below the reflective coating 54. The length 517 of 500 nm over which the substrate 51 has a particularly high hydrogen content has in the example illustrated here a distance of no more than 1 mm, preferably no more than 100 with particular preference no more than 20 with very particular preference no more than from the reflective coating 54, with the result that the substrate 51 has a desirably high hydrogen content as close as possible to the reflective coating 54. At a greater distance from the reflective coating 54 along the imaginary line 513 perpendicular to the surface region 511, the substrate 51 in the example shown here has a lower hydrogen content, as can also occur in conventional titanium-doped quartz glasses. In particular, the substrate 51 has a hydrogen content of less than $5\times10^{17}$ molecules/cm$^3$, preferably less than $1\times10^{17}$ molecules/cm$^3$, with particular preference less than $1\times10^{16}$ molecules/cm$^3$, along the imaginary line 513 perpendicular to the surface region 511 with the reflective coating 54 at a distance therefrom of at least 1 mm, preferably at least 1 cm.

The titanium-doped quartz glass blank can be loaded with a high hydrogen content even before it is machined into a substrate at temperatures above room temperature, for example in the range up to 600° C., preferably at approximately 100° C. to 200° C., in particular in the vicinity of the surface region 511. Higher temperatures, for example in the range from 400° C. to 600° C., make it possible for the desired hydrogen content or particularly high hydrogen contents to be reached more quickly. However, at higher temperatures, Ti3+ can form to a greater extent, which can lead to blackening of the quartz glass and can also have an undesirable influence on the coefficient of thermal expansion of the quartz glass.

The blank can also initially be largely or completely machined into its final shape, so that a substantially coatable substrate is available, which is loaded with hydrogen before coating. Both the blank and the substantially coatable substrate can preferably be loaded with hydrogen in an autoclave at hydrogen partial pressures in the range of preferably approximately 10 atm to 100 atm. Particularly narrow hydrogen gradients with high contents in the surface region can be obtained in particular at higher pressures.

In the event that material is removed from the surface by polishing after loading with hydrogen and before coating, the maximum of the distribution of the hydrogen content can be located particularly close below the reflective coating then applied. Simulations suggest that even if the hydrogen content in the surface region, especially in the immediate vicinity below the reflective coating, is somewhat lower than desired shortly after the coating, for example due to relatively long storage times between loading and coating or targeted tempering, the hydrogen content will increase over months and years below the reflective coating.

After coating, surface defects that are still present or that have occurred during the coating process can be corrected by compacting irradiation. It is also possible, optionally even before the coating, to carry out an extensive compaction process over at least the entire coated area, during which in the irradiated substrate regions having a high hydrogen content bonds are broken up and saturated as SiH or SiOH in order to additionally increase the long-term stability of the reflective optical element overall. During subsequent storage, the hydrogen can diffuse further into the substrate and can also emerge from the substrate at uncoated surfaces, in particular. For example, Mo/Si multilayer coatings are good diffusion barriers for hydrogen. Simulations suggest that substrates that are loaded with hydrogen in the region of their surfaces before coating, still have very high hydrogen contents in the region of the surface coated, for example, with a Mo/Si multilayer system even after several years of storage. On the uncoated surface regions, by contrast, the hydrogen content can drop significantly within merely months. In particular, reflective optical elements according to variant 2 and as described in connection with FIG. 3 can have substrates 51 that have a hydrogen content of more than $5 \times 10^{18}$ molecules/cm$^3$ within a time period of up to one month after application of the reflective coating 54 along an imaginary line 517 perpendicular to the surface region 511 with the reflective coating 54 over a length 517 of 500 nm or more, and still have a hydrogen content of more than $1 \times 10^{18}$ molecules/cm$^3$ within a time period from one month after application of the reflective coating 54 up to seven years after application of the reflective coating 54. In the case of a reflective optical element whose substrate has a further surface region, which is located on a side of the substrate facing away from the surface region with the reflective coating and has no reflective coating, as is the case for example in the example shown in FIG. 3, the substrate can have within said time period, along the imaginary line over a further length of 500 nm or more at a distance of no more than 2 mm from the surface of the further surface region, a hydrogen content of no more than half and no less than one twentieth of the hydrogen content over the length at a distance of no more than 1 mm from the reflective coating. This is because on the side of the reflective optical element without a reflective coating, the hydrogen can diffuse out of the substrate over time. In this case, the maximum of the distribution of the hydrogen content slowly moves into the interior of the substrate. The exact hydrogen content in the further surface region and its distribution at a certain point in time depends in particular on the specific hydrogen loading.

Figure 4:
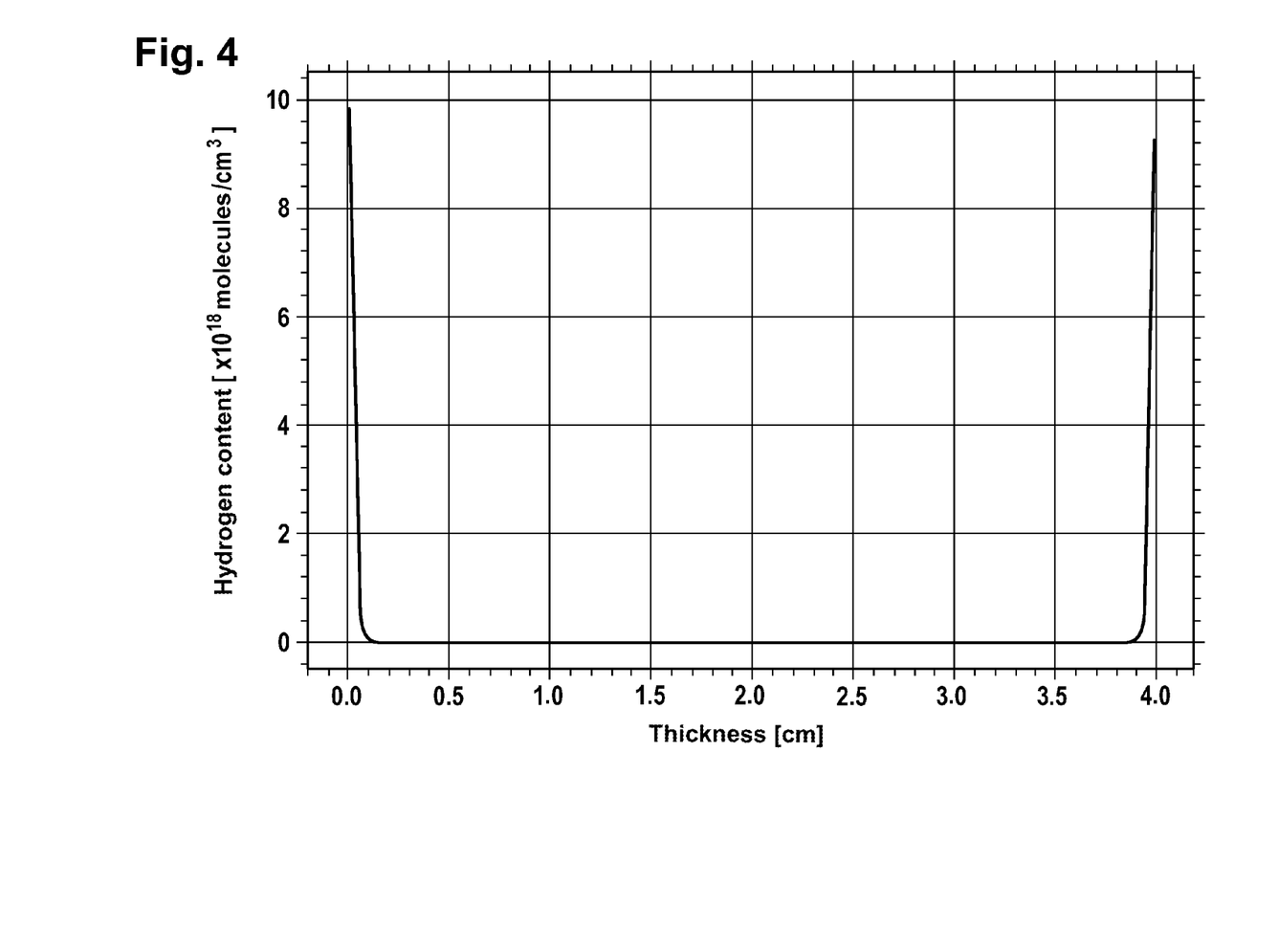
FIG. 4 shows the distribution of the hydrogen content over the width of the substrate of a reflective optical element at a first point in time.
Figure 5:
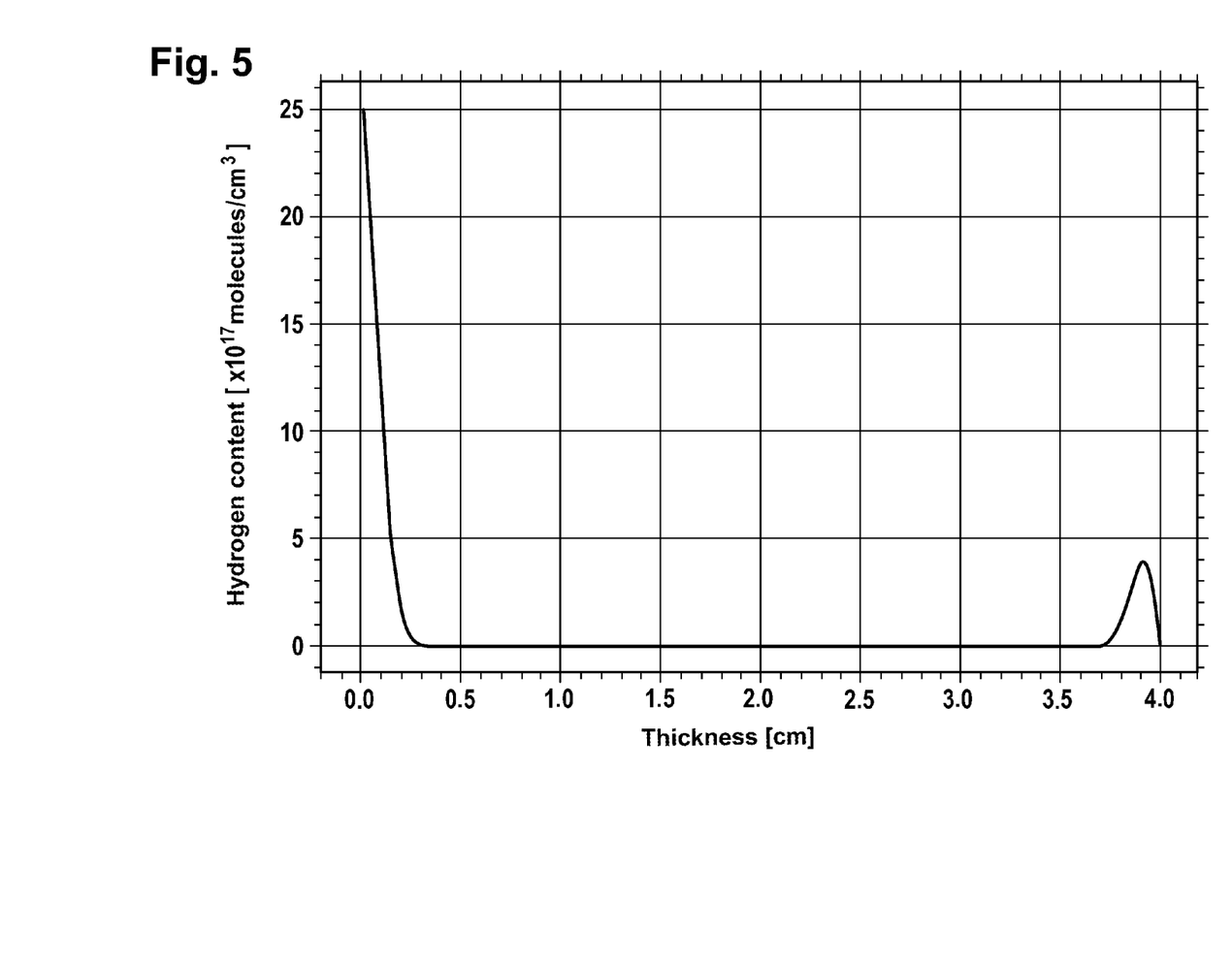
FIG. 5 shows the distribution of the hydrogen content over the width of the substrate of a reflective optical element at a second point in time.

As an example, reference is made to FIGS. 4 and 5, in which a simulation is shown in which it is assumed that titanium-doped quartz glass is loaded at a hydrogen partial pressure of 25 bar and a temperature of approximately 250° C. over 5 hours. The hydrogen content distribution thus obtained is shown in FIG. 4. The thickness of the substrate in mm is plotted on the x-axis, wherein the substrate has a thickness of 4 cm and a reflective coating is assumed on the surface at 0 cm that acts as a diffusion barrier for hydrogen, such as a molybdenum silicon multilayer system. By contrast, on the opposite area at 4 cm, the surface is uncoated, so that the hydrogen located in the region of this surface can diffuse out of the substrate over time. After loading, there is a hydrogen content on both surfaces of $10 \times 10^{18}$ molecules/cm$^3$ that, within a distance of one millimeter from the respective surface, is merely barely a tenth thereof.

FIG. 5 shows the simulated state after 7 years of storage at room temperature. Adjoining the reflective coating at 0 mm, the distribution of the hydrogen content has widened somewhat and its amplitude has decreased by a factor of 4. On the uncoated, opposite side of the substrate at 4 mm, the distribution in amplitude is reduced by a factor of more than 20 and the distribution of the hydrogen content has likewise widened somewhat.

It should be noted that this effect is discussed here in relation to the surface with a reflective coating and the opposite surface without a coating for the sake of clarity. However, this effect is of course also expected for differently positioned surfaces, such as side surfaces. Here, too, a greater decrease in the hydrogen content over time is to be expected over time if the respective surface is not coated after loading with hydrogen compared to if it is coated.

In a modification of the variant described in connection with FIG. 3, in addition to the high hydrogen content, the substrate 51 can also have at least and preferably in the vicinity of the surface region 511 a proportion of Si—O—O—Si bonds of at least $1*10^{16}$/cm$^3$ and/or a proportion of Si—Si bonds of at least $1*10^{16}$/cm$^3$ in order to more effectively reduce relaxation after compaction.

The hydroxyl and hydrogen contents as well as the proportion of defects in the quartz glass matrix such as Si—O—O—Si bonds or Si—Si bonds can be determined, for example, via Raman spectroscopy on the finished substrate or reflective optical element with resolutions down to the sub-millimeter range. With confocal Raman spectroscopy, resolutions in the sub-micrometer range can also be achieved. Raman spectroscopy can also be used to determine the fictitious glass transition temperature of different substrate regions, for example via the ratio of three- to fourfold SiO$_2$ rings. Depending on whether it is an uncorrected region or a region compacted for correction purposes by high-energy irradiation, different fictitious glass transition temperatures and different defect densities can be expected.

In the embodiments of a reflective optical element 50 shown in FIG. 2 or 3, the substrate 51 has a density variation of approximately 1% by volume at least along an imaginary surface 514 with a fixed distance between 1 μm and 100 μm from the surface 512. For the sake of clarity, this is only shown in FIG. 2. After coating the substrate, a fine correction of the surface profile was carried out according to the procedure described in WO 2013/050199 A1. In particular, the correction was carried out by local compaction in the region 516 of the substrate with an electron beam, wherein the electron energy was selected such that the electrons penetrate through the reflective coating 54 with the protective layer 53 and deposition is effected completely in the first micrometers in the substrate 51 below the reflective coating 54. As a result, the titanium-doped quartz glass is compacted by up to approximately 1% in all substrate variants, which in the example shown here leads to a surface deformation of approximately 10 nm.

The reflective optical elements proposed here show improved long-term stability of the surface shape. In particular, the relaxation of the corrections written by compacting is reduced. Even after seven years, for example, it can be expected that the corrections will still have an amplitude of over two thirds of their original amplitude.

Further preferred applications of the reflective optical elements based on the substrates proposed here include, in addition to EUV lithography, optical systems for inspection systems for, for example, wafers or masks or for spectroscopic applications, for example in astrophysics, in particular extra-terrestrial physics.

REFERENCE SIGNS

10 EUV lithography apparatus
12 EUV radiation source
13 Collector mirror
14 Illumination system
15 First mirror
16 Second mirror
17 Mask
18 Third mirror
19 Fourth mirror
20 Projection system
21 Wafer
50 Collector mirror
51 Substrate
511 Surface region
512 Surface
514 Line
513 Line
515 Region
516 Region
517 Length
53 Protective layer
54 Multilayer system
55 Pair of layers
56 Absorber
57 Spacer

What is claimed is:

1. A substrate for an optical element configured to reflect extreme ultraviolet wavelength light,
    wherein the substrate is made of titanium-doped quartz glass that has a surface region configured to be coated, and
    wherein the titanium-doped quartz glass has, at least in a vicinity of the surface region, a proportion of Si—O—O—Si bonds of at least $1*10^{16}/cm^3$ or a proportion of Si—Si bonds of at least $1*10^{16}/cm^3$.

2. The substrate as claimed in claim 1, wherein the titanium-doped quartz glass has, at least in the vicinity of the surface region, a proportion of the Si—O—O—Si bonds of at least $1*10^{19}/cm^3$ or a proportion of Si—Si bonds of at least $1*10^{19}/cm^3$.

3. The substrate as claimed in claim 1, wherein the titanium-doped quartz glass has silicon fluoride or silicon chloride at least in the vicinity of the surface region.

4. The substrate as claimed in claim 1, wherein the titanium-doped quartz glass has an average hydroxyl content of at most 100 ppm by weight at least in the vicinity of the surface region.

5. The substrate as claimed in claim 4, wherein the titanium-doped quartz glass has a matrix terminator content of at most 20% of the hydroxyl content in the vicinity of the surface region.

6. The substrate as claimed in claim 4, wherein the titanium-doped quartz glass has a hydrogen content of less than $1\times10^{16}$ molecules/cm$^3$ at least in the vicinity of the surface region.

7. An optical element configured to reflect extreme ultraviolet wavelength light, comprising a substrate according to claim 1 and a surface region with a reflective coating.

8. The reflective optical element as claimed in claim 7, wherein the substrate has a hydrogen content of more than $5\times10^{18}$ molecules/cm$^3$ along an imaginary line perpendicular to the surface region with the reflective coating over a length of at least 500 nm.

9. The reflective optical element as claimed in claim 8, wherein the substrate has a hydrogen content of more than $1\times10^{20}$ molecules/cm$^3$, along the imaginary line perpendicular to the surface region with the reflective coating over a length of at least 500 nm.

10. The reflective optical element as claimed in claim 8, wherein the length of at least 500 nm has a distance from the reflective coating of at most 1 mm.

11. The reflective optical element as claimed in claim 10, wherein the length of at least 500 nm has a distance from the reflective coating of at most 5 μm.

12. The reflective optical element as claimed in claim 8, wherein the substrate has a hydrogen content of less than $5\times10^{17}$ molecules/cm$^3$ along the imaginary line perpendicular to the surface region with the reflective coating at a distance therefrom of at least 1 mm.

13. The reflective optical element as claimed in claim 12, wherein the substrate has a hydrogen content of less than $1\times10^{16}$ molecules/cm$^3$, along the imaginary line perpendicular to the surface region with the reflective coating at a distance therefrom of at least 1 cm.

14. The reflective optical element as claimed in claim 7, wherein the substrate has a hydrogen content of more than $5\times10^{18}$ molecules/cm$^3$ within a time period of up to one month after application of the reflective coating along an imaginary line perpendicular to the surface region with the reflective coating over a length of at least 500 nm.

15. The reflective optical element as claimed in claim 14, wherein the substrate has a hydrogen content of more than $1\times10^{18}$ molecules/cm$^3$ within a time period from one month after the application of the reflective coating to seven years after the application of the reflective coating.

16. The reflective optical element as claimed in claim 14, wherein the substrate has a hydrogen content of more than $5\times10^{18}$ molecules/cm$^3$ along an imaginary line perpendicular to the surface region with the reflective coating over a length of at least 500 nm,
    wherein the substrate has a further surface region, which is located on a side of the substrate facing away from the surface region with the reflective coating and has no reflective coating, and wherein the substrate has, along the imaginary line over a further length of at least 500 nm with a distance of no more than 2 mm from the surface of the further surface region, a hydrogen content of no more than half and no less than one twentieth of the hydrogen content over the length at a distance of no more than 1 mm from the reflective coating.

17. An optical system having a reflective optical element as claimed in claim 7.

18. An EUV lithography apparatus having an optical system as claimed in claim 17.

19. A substrate for an optical element configured to reflect extreme ultraviolet wavelength light,
wherein the substrate is made of titanium-doped quartz glass that has a surface region configured to be coated,
wherein the titanium-doped quartz glass has a hydrogen content of more than $5 \times 10^{18}$ molecules/cm$^3$ along an imaginary line perpendicular to the surface region over a length of at least 500 nm, and
wherein the titanium-doped quartz glass has, at least in the vicinity of the surface region, a proportion of Si—O—O—Si bonds of at least $1*10^{16}$/cm$^3$ or a proportion of Si—Si bonds of at least $1*10^{16}$/cm$^3$.

* * * * *

UNITED STATES PATENT AND TRADEMARK OFFICE
CERTIFICATE OF CORRECTION

PATENT NO. : 11,987,521 B2
APPLICATION NO. : 17/136642
DATED : May 21, 2024
INVENTOR(S) : Eva

It is certified that error appears in the above-identified patent and that said Letters Patent is hereby corrected as shown below:

In the Specification

Column 8, Line 46, delete "20" and insert -- 20 μm, --.

Column 8, Line 47, before "from" insert -- 5 μm, --.

Signed and Sealed this
Tenth Day of September, 2024

Katherine Kelly Vidal
*Director of the United States Patent and Trademark Office*